United States Patent
Hofbeck et al.

(10) Patent No.: US 6,822,559 B2
(45) Date of Patent: Nov. 23, 2004

(54) SECURITY SYSTEM FOR A MOTOR VEHICLE

(75) Inventors: Klaus Hofbeck, Regensburg (DE); Wolfgang Piesch, Regenstauf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/957,385

(22) Filed: Sep. 20, 2001

(65) Prior Publication Data

US 2002/0075137 A1 Jun. 20, 2002

(30) Foreign Application Priority Data

Sep. 20, 2000 (DE) ......................................... 100 46 576

(51) Int. Cl.⁷ .............................................. B60R 25/10
(52) U.S. Cl. ................................... 340/426.1; 307/10.2
(58) Field of Search ............................. 340/426.1, 428, 340/429, 430, 426.11, 426.12; 307/10.1, 10.2, 10.3

(56) References Cited

U.S. PATENT DOCUMENTS

| | | | | |
|---|---|---|---|---|
| 3,967,239 A | * | 6/1976 | Steele ......................... | 340/430 |
| 4,539,548 A | * | 9/1985 | Crites ......................... | 340/428 |
| 5,181,010 A | * | 1/1993 | Chick ...................... | 340/426.25 |
| 5,304,979 A | * | 4/1994 | Lima et al. .................. | 340/428 |
| 5,412,370 A | * | 5/1995 | Berman et al. ......... | 340/426.36 |
| 5,850,174 A | * | 12/1998 | DiCroce et al. ....... | 340/426.28 |
| 5,977,654 A | * | 11/1999 | Johnson et al. ............ | 307/10.3 |
| 6,011,460 A | * | 1/2000 | Flick ...................... | 340/426.25 |
| 6,232,873 B1 | * | 5/2001 | Dilz et al. .............. | 340/426.25 |

FOREIGN PATENT DOCUMENTS

| | | |
|---|---|---|
| DE | 41 23 654 | 1/1993 |
| DE | 198 39 355 | 4/2000 |
| DE | 198 46 803 | 9/2000 |

* cited by examiner

Primary Examiner—Thomas Mullen
(74) Attorney, Agent, or Firm—Laurence A. Greenberg; Werner H. Stemer; Ralph E. Locher

(57) ABSTRACT

A security system for a motor vehicle is described. The security system has at least one sensor for sensing a status variable of the motor vehicle, a security device for disabling or enabling use of the motor vehicle, and a control unit, connected at the input end to the sensor and at the output end to the security device. The control unit disables activation of the security device as a function of the status variable, in order to prevent incorrect operation. The control unit has a logic circuit that not only blocks the security device preventing activation, as a function of the status variable, but also activates the security device as a function of the status variable, independently of a user intervention.

21 Claims, 1 Drawing Sheet

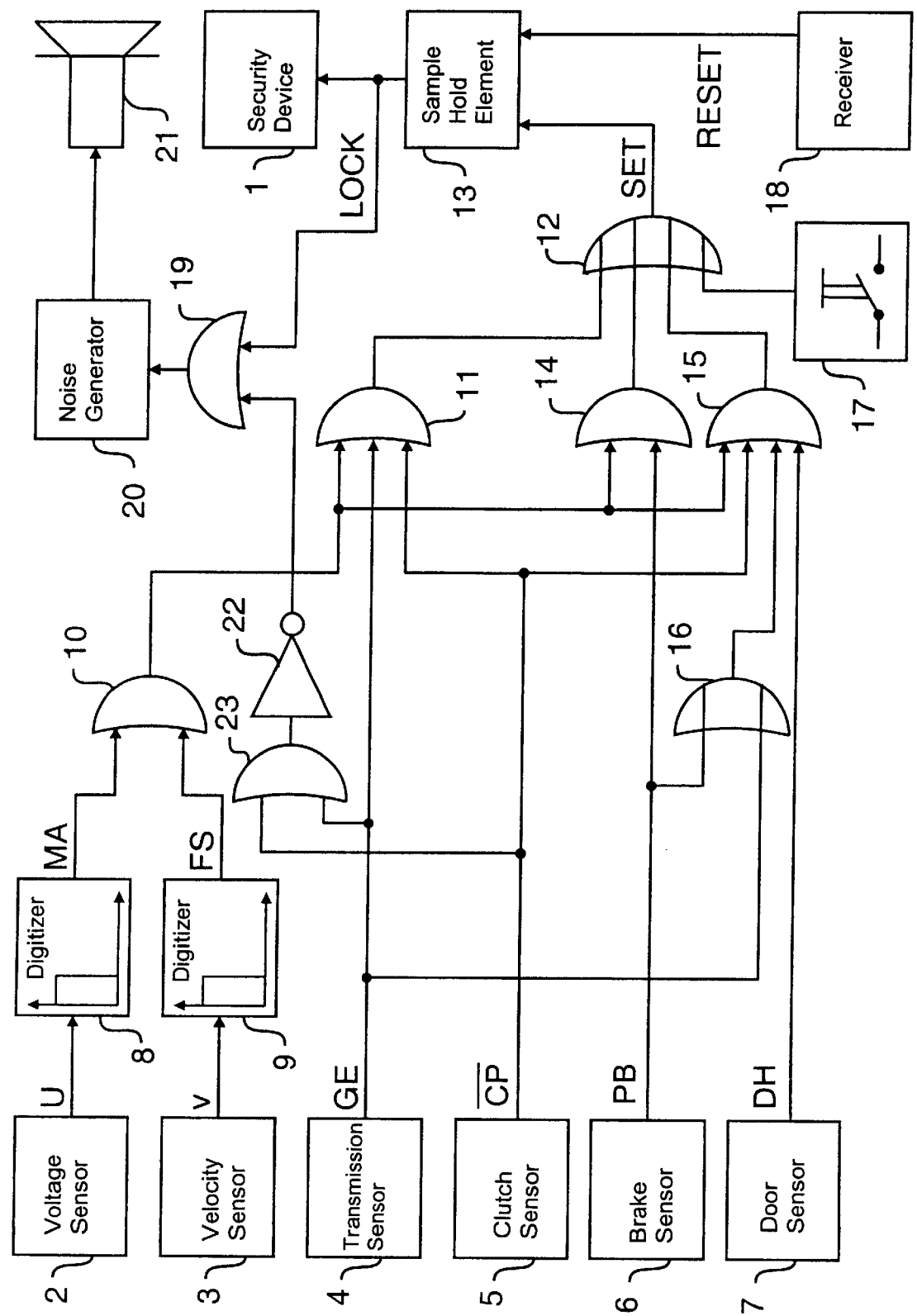

SECURITY SYSTEM FOR A MOTOR VEHICLE

BACKGROUND OF THE INVENTION

Field of the Invention

The invention relates to a security system for a motor vehicle. The security system has at least one sensor for sensing a status variable of the motor vehicle, a security device for disabling or enabling use of the motor vehicle, and a control unit connected to sensor and the security device. The control unit disables or activates the security device as a function of the status variable in order to prevent incorrect operation.

Motor vehicles conventionally have a security device for disabling or enabling the use of the vehicle, for example in the form of a steering wheel lock, transmission lock or immobilizer. Such a security device is usually activated when a mechanical or electronic key is pulled out of an ignition lock of the motor vehicle so that the driver automatically activates the security device when he/she leaves the motor vehicle.

However, keyless security systems are also known in which the driver carries a transmitter which, when positioned in the passenger compartment of the vehicle, automatically deactivates the security device in order to permit the motor vehicle to operate. However, the locking of the security device must not be readily activated in such a keyless security system when the driver leaves the motor vehicle because otherwise failure of the transmitter while the motor vehicle is operating would lead to undesired activation of the security device. In keyless security systems, the activation of the security device is therefore carried out by a manual user intervention, for example by the driver activating a pushbutton key in the passenger compartment of the vehicle. As an additional protection against undesired activation of the security device, the velocity of the vehicle and the engine status are sensed, the activation of the security device being disabled when the engine is running and while the motor vehicle is traveling.

A disadvantage of the keyless security system for the motor vehicle described above is that the security system must be activated by a manual user intervention in all cases. This entails the risk of the motor vehicle remaining unsecured if the driver forgets to activate the security system when leaving the motor vehicle.

SUMMARY OF THE INVENTION

It is accordingly an object of the invention to provide a security system for a motor vehicle which overcomes the above-mentioned disadvantages of the prior art devices of this general type, in which it is impossible to forget to activate the security device when leaving the motor vehicle.

With the foregoing and other objects in view there is provided, in accordance with the invention, a security system for a motor vehicle having an engine. The security system includes at least one sensor for sensing a status variable of the motor vehicle, a security device for disabling and enabling use of the motor vehicle, and a control unit having an input connected to the sensor and an output connected to the security device. The control unit disables and activates the security device in dependence on the status variable, to prevent an incorrect operation of the motor vehicle. The control unit has a logic circuit that not only blocks the security device for preventing activation, in dependence on the status variable, but also activates the security device in dependence on the status variable, independently of a user intervention.

The invention involves the general technical teaching of automatically activating the security system of a motor vehicle as a function of one or more status variables of the motor vehicle, the status variables being measured by sensors. The sensing of the status variables of the motor vehicle is used here therefore not only to prevent incorrect operation—as is the case in the keyless security system described above—but also permits automatic activation of the security device independently of a manual user intervention.

The security system according to the invention preferably has a plurality of sensors which each sense a status variable of the motor vehicle in order to activate or deactivate the security device as a function of the status variables. The evaluation of a plurality of status variables provides the advantage that an undesired activation of the security device can largely be prevented because the output signals of the sensors are logically connected to one another. Preferably, the output signals of the sensors are subjected here to a plausibility check in order to prevent an undesired activation of the security device in the event of a failure or a malfunction of one or more of the sensors.

In the preferred embodiment of the invention, one of the sensors is a transmission sensor that senses the gearshift setting of a manual or automatic transmission. The invention is based here on the knowledge that, before leaving a motor vehicle, the driver of the motor vehicle selects the first gear speed in a manually-shifted transmission and the park setting in an automatic transmission. For this reason, the activation of the security device is preferably enabled only if the first gear speed or the park setting is selected.

Furthermore, a clutch sensor, which senses the setting of a clutch pedal of the motor vehicle, is preferably connected, the activation of the security device being preferably enabled only if the clutch pedal of the motor vehicle is not activated.

Moreover, a brake sensor is preferably provided which senses the setting of a parking brake of the motor vehicle, the activation of the security device being preferably enabled only if the parking brake is activated.

In addition, in the preferred embodiment of the invention, at least one door contact sensor or at least one door handle sensor is provided, the activation of the security device being preferably enabled only if the door contact sensor or the door handle sensor is activated.

Furthermore, a velocity sensor is preferably provided which measures the velocity of the motor vehicle, the activation of the security device being preferably enabled only if the motor vehicle is stationary and the velocity is therefore zero.

Finally, a voltage sensor that measures the electrical voltage generated by a generator of the motor vehicle is preferably connected, the activation of the security device being preferably enabled only if the voltage measured by the voltage sensor is zero.

In one variant of the invention, a signal generator is also provided in order to signal the activation status of the security device to the driver. The signal generator can be, for example, a visual signal generator in the form of a monitoring light or an acoustic signal generator, for example in the form of a warning buzzer. The signal generator is preferably activated by a logic circuit that is additionally connected to at least one of the sensors in order to activate the signal generator as a function of the status variable or variables. The logic circuit is preferably connected to the transmission sensor and the clutch sensor in order to also activate the signal generator when the security device is activated if the clutch is depressed or the gearshift lever is moved into the idling setting or neutral setting.

In one variant of the invention, a manual activation element is additionally provided in order to be able to activate the security device independently of the status variables measured by the sensors, which is important in the event of a sensor failure, for example.

The security device is preferably deactivated by a transmitter that transmits an encoded signal to a receiver in the motor vehicle as long as the transmitter is located in the passenger compartment of the vehicle or at a predefined distance from the motor vehicle.

In accordance with an added feature of the invention, the control unit has a first AND gate with a first input connected to the velocity sensor and a second input connected to the voltage sensor to enable an activation of the security device only when the motor vehicle is stationary and the engine is switched off.

In accordance with an additional feature of the invention, the control unit has a second AND gate with a first input connected to the transmission sensor and a second input connected to the clutch sensor and the second AND gate enables the activation of the security device only if a gear is engaged and the clutch pedal is not activated. The control unit has a third AND gate with a first input connected to the door sensor and a second input connected to the clutch sensor and enables the activation of the security device only if the door sensor is activated while the clutch pedal is not activated. The control unit has a fourth AND gate with a first input connected to the brake sensor and a second input connected to the first AND gate. The fourth AND gate enables the activation of the security device only if the parking brake is activated and the motor vehicle is stationary and the engine is switched off.

In accordance with another feature of the invention, the security device includes at least one safety device being a steering wheel lock, an immobilizer, an alarm system and/or a transmission lock.

In accordance with a further feature of the invention, a switching element is connected to one of the inputs of the control unit in order to activate the security device manually independently of an automatic activation by the sensors.

In accordance with another added feature of the invention, a sample-and-hold element is connected to the output of the control unit in order to maintain the activation status of the security device after an activation, independently of the status variables.

In accordance with another further feature of the invention, the sample-and-hold element has a resetting input in order to be able to deactivate the security device again after the activation.

In accordance with a concomitant feature of the invention, a receiver is connected to the resetting input. The receiver is part of a transmitter which permits keyless operation of the motor vehicle.

Other features which are considered as characteristic for the invention are set forth in the appended claims.

Although the invention is illustrated and described herein as embodied in a security system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a block circuit diagram of a security system according to the invention for a motor vehicle.

DESCRIPTION OF THE PREFERRED EMBODIMENTS

Referring now to the single FIGURE of the drawing, there is shown a keyless security system for a motor vehicle which permits the use of the motor vehicle to be disabled or enabled and for this purpose has a security device 1 which is illustrated only schematically and contains a transmission lock and a steering wheel lock.

The security device 1 is activated as a function of a plurality of status variables of the motor vehicle that are sensed by a plurality of sensors 2–7, as described below.

The security system according to the invention has a voltage sensor 2 that measures an electrical voltage U that is generated by a generator (i.e. alternator) of the motor vehicle and is applied to a terminal. At an output end, the voltage sensor 2 is connected to a digitization element 8, which generates an output signal MA (engine off) as a function of the measured voltage value, the output signal MA assuming a high level when the voltage drops below a predefined value, whereas the output signal MA has a low level when the operating voltage is normal.

Furthermore, the security system illustrated has a velocity sensor 3 that measures a velocity v of the motor vehicle.

At the output end, the velocity sensor 3 is connected to a digitizing element 9 which generates a digital output signal FS (vehicle stationary) as a function of the measured velocity v, the output signal FS assuming a high level when the vehicle is stationary and a low level when it is traveling.

At an output end, the two digitization elements 8, 9 are connected to an AND element 10 which thus outputs a high level at the output end if the engine is switched off and the vehicle is stationary.

Furthermore, a transmission sensor 4 is provided which outputs a digital output signal GE as a function of the gearshift setting of the transmission, the output signal GE assuming a high level if the first gear speed of the transmission is selected, whereas the output signal GE of the transmission sensor 4 assumes a low level if the transmission is operated with other drive ratios.

In addition, the security system illustrated has a clutch sensor 5 which generates a digital output signal /CP as a function of the activation of the clutch pedal, the output signal /CP assuming a high level if the clutch is not activated, whereas the output signal /CP of the clutch sensor 5 assumes a low level if the clutch is not activated. The AND element 10, the transmission sensor 4 and the clutch sensor 5 are connected at the output end to an AND element 11 at whose output a high level thus appears if the engine is switched off (MA=high), the vehicle is stationary (FS=high), the first gear speed of the transmission is selected (GE=high) and the clutch pedal is not activated (/CP=high).

At the output end, the AND element 11 is connected via an OR element 12 to a sample-and-hold element 13 which drives the security device 1. A high level at the output of the AND element 11 therefore sets the sample-and-hold element 13, which causes the security device 1 to be driven.

Furthermore, the illustrated security system according to the invention has a brake sensor 6 which generates an output signal PB (parking brake) as a function of the status of a parking brake of the motor vehicle, a high level appearing at the output of the brake sensor 6 if the parking brake is activated, whereas the output signal PB assumes a low level when the parking brake is released.

At the output end, the brake sensor 6 is connected to an AND element 14 whose other input is connected to the output of the AND element 10. A high level therefore appears at the output of the AND element 14 if the engine is switched off, the vehicle is stationary and the parking brake is activated. The high level is conducted via the downstream OR element 12 to the setting input of the sample-and-hold element 13 so that the security device 1 is activated.

Finally, the illustrated security system according to the invention also has a door handle sensor 7 which generates an output signal DH (door handle) as a function of the status of a door contact, the output signal DH assuming a high level if the door handle is activated. At the output end, the door handle sensor 7 is connected to an AND element 15, the other inputs of the AND element 15 being connected to the output of the AND element 10, the clutch sensor 5 and an OR element 16. The OR element 16 is in turn driven by the brake sensor 6 and the transmission sensor 4 so that a high level appears at the output of the AND element 15 if the engine is switched off, the motor vehicle is stationary, the clutch pedal is not activated, and the door handle has been activated while the parking brake has been activated or the first gear speed of the transmission is selected. Such a high level is conducted via the OR element 12 to the setting input of the sample-and-hold element 13, so that in this case the security device is activated.

In addition, the illustrated security system according to the invention makes it possible to activate the security device 1 by manual user intervention, independently of the status variables of the motor vehicle that are sensed by the sensors 2–7. For this purpose, the security system has a switch 17 which is connected to an input of the OR element 12.

The sample-and-hold element 13 basically maintains the activation status of the security device for an unlimited time until a low level appears at a resetting input Reset of the sample-and-hold element 13. In order to deactivate the security device 1, the resetting input Reset of the sample-and-hold element 13 is connected to a receiver 18 which receives an identification signal from an associated transmitter as long as the transmitter is located in the passenger compartment of the motor vehicle. In such a case, a high level appears at the output of the receiver 18, which causes the sample-and-hold element 13 to be reset, and thus the security device 1 to be deactivated.

In addition, the illustrated security system according to the invention permits the activation status of the security device to be signaled. For this purpose, the sample-and-hold element 13 is connected at the output end via an AND element 19 to a noise generator 20 to which a loudspeaker 21 is connected. The other input of the AND element 19 is connected via an inverter 22 and an AND element 23 to the transmission sensor 4 and to the clutch sensor 5 so that the loudspeaker 21 is activated if the clutch is depressed or the transmission is placed in the idling setting after the security device 1 has been activated.

The invention is not restricted to the preferred exemplary embodiment described above. Instead, a multiplicity of variants and refinements that make use of the inventive idea and also fall within the scope of protection are conceivable.

We claim:

1. A security system for a motor vehicle having an engine, comprising:
   at least one status sensor for sensing a status variable of the motor vehicle, said status sensor being selected from the group consisting of a transmission sensor sensing a gearshift setting of a manual or automatic transmission, a clutch sensor sensing a setting of a clutch pedal of the motor vehicle, a brake sensor sensing a setting of a parking brake of the motor vehicle, and a velocity sensor,
   a security device for disabling or enabling use of the motor vehicle; and
   a control unit having an input connected to said sensor and an output connected to said security device, said control unit disabling an activation of said security device in dependence on the status variable, to prevent an incorrect operation of the motor vehicle, said control unit having a logic circuit not only blocking said security device from being activated, in dependence on the status variable, but also activating said security device in dependence on the status variable, independently of a user intervention.

2. The security system according to claim 1, wherein said at least one status sensor is one of a plurality of sensors sensing status variables of the motor vehicle for activating and deactivating said security device in dependence on the status variables, said input of said control unit is one of a plurality of inputs connected to said plurality of sensors.

3. The security system according to claim 2, including a switching element connected to one of said inputs of said control unit in order to activate said security device manually independently of an automatic activation by said sensors.

4. The security system according to claim 2, including a sample-and-hold element connected to said output of said control unit in order to maintain the activation status of said security device after an activation, independently of the status variables.

5. The security system according to claim 4, wherein said sample-and-hold element has a resetting input in order to be able to deactivate the security device again after the activation.

6. The security system according to claim 5, including a receiver connected to said resetting input, said receiver cooperating with a transmitter which permits keyless operation of the motor vehicle.

7. The security system according to claim 1, wherein said security device includes at least one safety device selected from the group consisting of a steering wheel lock, an immobilizer, an alarm system and a transmission lock.

8. A security system for a motor vehicle having an engine, comprising:
   a plurality of sensors for sensing status variables of the motor vehicle;
   a security device for disabling or enabling use of the motor vehicle; and
   a control unit having a plurality of inputs connected to said sensors and an output connected to said security device, said control unit disabling an activation of said security device in dependence on the status variables, to prevent an incorrect operation of the motor vehicle, said control unit having a logic circuit not only blocking said security device from being activated, in dependence on the status variables, but also activating said security device in dependence on the status variable, independently of a user intervention;

one of said sensors being a transmission sensor connected to one of said inputs of said control unit, said transmission sensor sensing a gearshift setting of a manual or automatic transmission.

9. The security system according to claim 8, wherein one of said sensors is a clutch sensor connected to one of said inputs of said control unit, said clutch sensor sensing a setting of a clutch pedal of the motor vehicle.

10. The security system according to claim 9, wherein one of said sensors is a brake sensor connected to one of said inputs of said control unit, said brake sensor sensing a setting of a parking brake of the motor vehicle.

11. The security system according to claim 10, wherein one of said sensors is a door sensor connected to one of said inputs of said control unit, said door sensor selected from the group of a door contact sensor and a door handle sensor.

12. The security system according to claim 11, wherein one of said sensors is a velocity sensor connected to one of said inputs of said control unit.

13. The security system according to claim 12, wherein one of said sensors is a voltage sensor connected to one of said inputs of said control unit, said voltage sensor sensing an electrical voltage generated by a generator of the motor vehicle.

14. The security system according to claim 13, wherein said control unit has a first AND gate with a first input connected to said velocity sensor and a second input connected to said voltage sensor to enable an activation of said security device only when the motor vehicle is stationary and the engine is switched off.

15. The security system according to claim 14, wherein said control unit has a second AND gate with a first input connected to said transmission sensor and a second input connected to said clutch sensor and said second AND gate enables the activation of said security device only if a gear is engaged and the clutch pedal is not activated.

16. The security system according to claim 15, wherein said control unit has a third AND gate with a first input connected to said door sensor and a second input connected to said clutch sensor and enables the activation of said security device only if said door sensor is activated while the clutch pedal is not activated.

17. The security system according to claim 16, wherein said control unit has a fourth AND gate with a first input connected to said brake sensor and a second input connected to said first AND gate, said fourth AND gate enabling the activation of said security device only if the parking brake is activated and the motor vehicle is stationary and the engine is switched off.

18. The security system according to claim 15, including a signal generator, said control unit having a further output connected to said signal generator to signal an activation status of said security device.

19. The security system according to claim 18, wherein said signal generator is selected from the group consisting of visual signal generators and acoustic signal generators.

20. The security system according to claim 18, wherein said control unit has a logic gate connected to said signal generator, said logic gate being additionally connected to at least one of said sensors in order to enable or disable the activation of said signal generator in dependence on the status variable.

21. The security system according to claim 20, wherein said logic gate has an input connected to said transmission sensor and said clutch sensor via an inverter and a fifth AND gate, said logic gate enables the activation of said signal generator if at least one of the clutch pedal is activated and the transmission is in the idling setting.

* * * * *